United States Patent

[11] 3,538,903

| [72] | Inventor | Louis Small |
| | | Huntington Woods, Michigan |
| [21] | Appl. No. | 711,622 |
| [22] | Filed | March 8, 1968 |
| [45] | Patented | Nov. 10, 1970 |
| [73] | Assignee | Service Diamond Tool Company |
| | | Ferndale, Michigan |
| | | a corporation of Michigan |

[54] CUTTING TOOL HOLDER
9 Claims, 5 Drawing Figs.

[52] U.S. Cl. ..................... 125/39, 125/11
[51] Int. Cl. ..................... B28d 5/04, B24b 53/00
[50] Field of Search .................. 125/11/39

[56] References Cited

UNITED STATES PATENTS

| 2,761,441 | 9/1956 | Loecy | 125/39 |
| 3,452,735 | 7/1969 | Bullock | 125/39 |

FOREIGN PATENTS

| 695,728 | 8/1953 | Great Britain | 125/39 |

Primary Examiner—Harold D. Whitehead
Attorney—Settle, Batchelder and Oltman

ABSTRACT: A holder for a diamond tool used in a machine for dressing wheels or the like and in which the holder includes a first portion or shank connected to the machine and a diamond tool supporting member rotatably connected to the shank. Means are incorporated between the shank and the supporting member which allows for a predetermined torque setting between the member and the shank to preset the force required for rotational adjustment of the member on the shank.

Patented Nov. 10, 1970
3,538,903
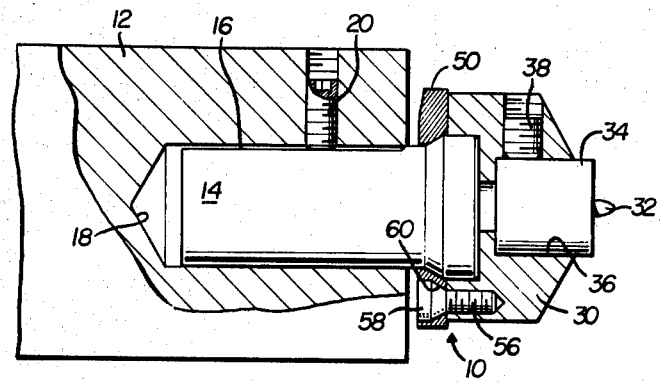
FIG. 1
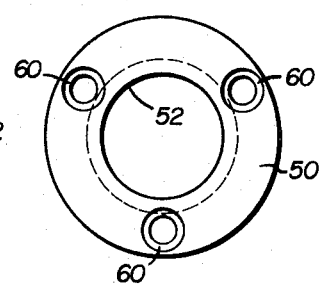
FIG. 4
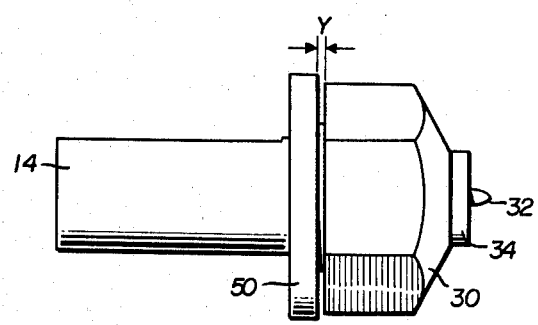
FIG. 3
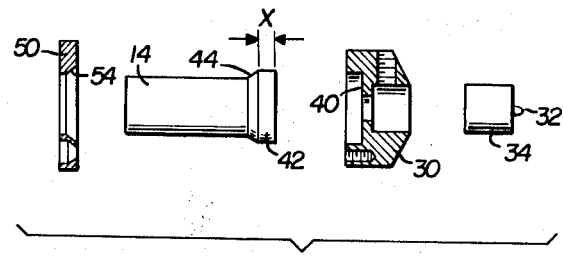
FIG. 2
FIG. 5
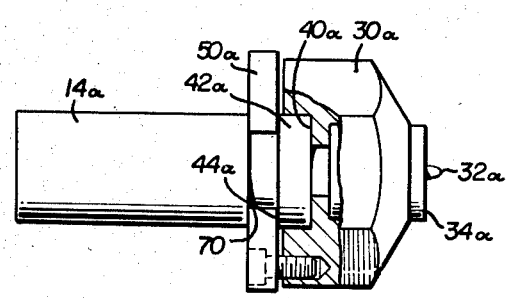
INVENTOR.
LOUIS SMALL.
BY
SETTLE, BATCHELDER & OLTMAN.
ATT'YS.

3,538,903

1

CUTTING TOOL HOLDER

BACKGROUND OF THE INVENTION

The present invention relates to cutting tool holders and more particularly to an improved means for adjustably mounting a diamond with respect to the remaining portion of a machine for dressing grinding wheels and the like.

It has heretofore been proposed to rotatably mount a diamond carrying member with respect to a fixed portion of the tool holder to allow for rotation of the two parts to present a fresh surface portion of the diamond to the grinding wheel thereby increasing the life of the diamond. One such device is disclosed in U.S. Pat. No. 2,761,441 issued to Joseph Loecy which discloses a diamond carrying member crimped to one end of a cap member which has an inwardly directed flange adjacent its opposite end and a corresponding outwardly directed flange on the shank of the tool holder. A tension ring is interposed between the two flanges so that the member may be rotated with respect to the shank by overcoming the frictional forces produced by the tension ring.

Actual use of such a device has found that there are several disadvantages inherent in such a mounting tool. Thus, it has been found that there is virtually no control of the amount of forces required for relative rotational movement between the shank and the diamond carrying member. This necessarily results from the manner of assembling the structure disclosed in the above mentioned patent. Thus, in assembly it is necessary to place the tension ring over the shank of the tool and into engagement with the outwardly directed flange and thereafter slide the cap member over the shank to locate the inwardly directed flange in engagement with the tension ring. Subsequently, the actual diamond carrying member is crimped to the free end of the cap member.

It is readily apparent that such an assembly operation results in a hit or miss proposition as to the exact amount of tension imposed between the cap member and the shank and, thus the force required for producing relative rotation between the member and the shank.

SUMMARY OF THE INVENTION

The primary object of the present invention is to provide an improved diamond tool holder which allows for a predetermined torque setting between relatively rotatable members of the holder to thereby allow for accurate control of the forces required for relative rotation.

Another object is to provide a diamond tool holder in which the forces required for relative rotation of two portions of the holder may readily and accurately be adjusted to any predetermined value.

A further object is to provide a simple and inexpensive effective means of rotatably supporting a diamond tool with respect to the remaining portion of the tool holder and provide accurate control of the forces required for relative rotational movement of the two portions of the holder.

Other objects of this invention will appear in the following description and appended claims reference being had to the accompanying drawings forming a part of this specification wherein like reference characters designate corresponding parts in the several views.

BRIEF DESCRIPTIONS OF DRAWINGS

FIG. 1 shows the tool holder of the present invention in its assembled condition and connected to a holder block forming part of the machine;

FIG. 2 is an exploded view of the several parts of the present invention prior to assembly;

FIG. 3 shows the parts of FIG. 2 in the partially assembled condition prior to tightening of the securing means;

FIG. 4 is a plan view of one of the elements of the assembly shown in FIG. 2; and FIG. 5 is a view similar to FIG. 3 showing a slightly modified form of the present invention.

2

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the tool holder 10 of the present invention is illustrated in FIG. 1 as being attached to a holder block 12 forming a part of conventional machine for dressing grinding wheels and the like. The holder 10 includes a shank 14 having a flattened portion 16 and being received in an opening 18 formed in the block 12. The shank 14 is fixedly retained in opening 18 by a set screw 20 engaging the flattened portion 16.

The shank 14 of the tool holder 10 rotatably supports a first member 30 which has the cutting tool or diamond mounted thereon. According to one aspect of the present invention, the diamond 32 is carried by a mounting block 34 received in an opening 36 defined on one end of the member 30 and releasably retained therein by a setscrew 38 or other equivalent releasable securing means. This allows for removal of the diamond 32 and its supporting member 34 without effecting the adjustment or otherwise disturbing the remaining portion of tool holder 10.

According to the primary aspect of the present invention, the member 30 is capable of being rotatable with respect to the shank 14 and the force required for this relative rotation can readily be set at a predetermined value and maintained at that setting. For this purpose, the first member or tool supporting member 30 has a recess 40 in one surface thereof. The recess or counterbore is cut to a predetermined depth, for a purpose to be described hereinafter Also, the shank 14, in the embodiment illustrated in FIGS. 1 through 4, has an enlarged portion 42 corresponding in cross-sectional area to the cross-sectional area of the recess 40. The axial length $x$ of the enlarged portion 42 is slightly greater than the depth of the recess 40 and has a tapered portion 44 at the shank end thereof, for a purpose which will become apparent hereinafter.

The tool holder further includes a second member or washer 50 having an opening 52 corresponding in size to the diameter of the main portion of the shank 14. The opening is counterbored to produce a taper 54 which corresponds to the angle of the tapered shoulder 44 defined between the enlarged portion 42 and the main body of the shank 14.

Adjustable securing means in the form of screws 56, are provided for interconnecting the second member or washer 50 with the first member or cap member 30. As can readily be seen from an inspection of FIG. 1, the screws are threadedly received in openings defined in the cap member 30 with head portions 58 received in openings 60 defined in the annular ring or washer 50. While three such openings are shown in FIG. 4, it is readily apparent that any number of openings may be provided.

In assembling the tool holder of the present invention, the parts, namely, the first member 30, the shank 14 and the washer or annular ring 50 are located in the manner illustrated in FIG. 2. Thus, the enlarged portion 42 is located within the recess 40 defined in the member 30. Thereafter, the washer or annular ring 50 is slid over the main body portion of the shank 14 and the tapered surface 54 is located in engagement with the tapered surface or shoulder 44 on the shank.

Prior to tightening of the adjustable screws 56, the relative dimensions of the portion 42 and the recess 40 will produce a small space $y$ between adjacent surfaces of the respective first and second members 30 and 50 as clearly shown in FIG. 3. Thus, if the screws 56 are merely threaded into the respective openings formed in the member 30 without tightening, there will be virtually no frictional forces between the shank 14 and the tool carrying member 30 so that relative rotation of these two members can be accomplished without any substantial amount of force.

However, upon tightening of the screws 56 in the threaded openings formed in the member 30 the space or distance y will be decreased due to a distortion of the annular ring or washer 50. This distortion of the washer 50 will result in a transformation of the washer 50 into a spring which will force portion 42 into the recess 40 thereby increasing the frictional forces between the adjacent engaging surfaces of the member 30 and the end of the shank 14. While a majority of the frictional forces are produced between the member 30 and the end of shank 14, it is readily apparent some frictional forces will be produced between the tapered surfaces 44 and 54. Thus, in the assembled condition shown in FIG. 1 maximum torque is produced between the shank 14 and the member 30. Of course, any intermediary forces between the zero and maximum forces may be preset in the tool holder by merely properly adjusting the respective screws 56 to vary the degree of distortion of the annular ring.

A slightly modified embodiment of the invention shown is disclosed in FIG. 5 wherein like parts have been referred to with the same reference numerals as the embodiment shown in FIG. 1 except that the suffix *a* has been added to each of the reference numerals. In the modified embodiment, the portion 42*a* is again of a length slightly greater than the depth of the recess 40*a* defined in the member 30*a*. However, in the modified embodiment, the portion 42*a* is produced by a substantially rectangularly shaped recess or groove 70 defined on the shank 14*a*. This defines a substantially radially extending shoulder 44*a* which is adapted to be engaged by the ring or washer 50*a*. Also, preferably, the ring or washer is of the split type to allow for insertion into the groove 70.

FIG. 5 shows the respective elements in their partially assembled position prior to producing a predetermined torque between the member 30*a* and the shank 14*a*. Thus, it can be seen that a small spacing is produced between the adjacent surfaces of the split ring 50*a* and the member 30*a*. Of course, the recess or groove need not be rectangular and could be configured to produce a tapered or equivalent shoulder 44*a*.

As can readily be appreciated from the above description, the invention provides a simple and inexpensive means of allowing for relative rotation between two members of a tool holder to thereby present a fresh surface of diamond to a grinding wheel which is to be dressed and the degree of force required for such rotation may be accurately set. Furthermore, the tool holder of the present invention provides another extremely advantageous feature in that if for any reason the diamond must be replaced, it is only necessary to release the setscrew 38 from the diamond hold portion 34 to allow for removal of diamond 32 and its holder 34 and replacement thereof. This of course is extremely beneficial in increasing the service life of the diamond holders since the remaining portion of the holder need not be replaced as is necessary in the type of holder disclosed in the above mentioned patent.

While two exemplary embodiments of the invention have been described in detail, it will be apparent to those skilled in the art that the disclosed embodiments may be modified. Therefore, the foregoing description is to be considered exemplary rather than limiting, and the true scope of the invention is that defined in the following claims:

I claim:

1. A tool holder for supporting a tool for dressing abrasive wheels comprising a first member mounting said tool, means defining a substantially circular recess of predetermined depth in a surface of said first member spaced from said tool, a shank having a portion at one end corresponding in cross section to the cross section of said recess and having a length axially of said shank greater than the depth of said recess, said portion terminating in a shoulder spaced from said one end, a second member engaging said shoulder, and securing means adjustably interconnecting said first and second members whereby adjustment of said securing means will vary the frictional forces between said first member and said shank.

2. A tool holder as defined in claim 1, in which said shoulder is tapered with respect to the axis of said shank and said second member includes a tapered portion corresponding to said tapered shoulder.

3. A tool holder as defined in claim 1, in which said shank has means defining a groove spaced from said one end to define said portion with one wall of said groove defining said shoulder, said second member having a portion received in said groove and engaging said shoulder.

4. A tool holder as defined in claim 1, including the further improvement of means defining an opening in a second surface of said first member, a mounting member supporting said tool and received in said opening and means releasably retaining said mounting member in said opening.

5. A holder for a diamond tool for dressing grinding wheels and the like comprising a shank adapted to be fixedly secured to a holding block of a machine, said shank having a shoulder spaced a predetermined distance from one end of said shank to define a shank portion between said shoulder and said one end, a collar supporting said diamond tool and having a recess corresponding to the cross section of said shank portion for rotatably receiving said shank portion with one end frictionally engaging the bottom of said recess, said recess having a depth slightly less than said predetermined distance, a distortable, slip-ring having a surface engaging said shoulder and initially axially spaced from said collar when in engagement with said shoulder, and adjustable securing means circumferentially spaced around said slip-ring for connecting said slip-ring to said collar, so that adjustment of said securing means will distort said slip-ring towards said collar to vary the friction coefficient between said collar and said shank portion to thereby preset the torque required for rotational adjustment of said collar on said shank.

6. A tool holder as defined in claim 5, in which adjacent surfaces of said collar and said slip-ring are spaced from each other when said slip-ring is in an undistorted condition and wherein the amount of distortion of said slip-ring will determine said torque.

7. A tool holder for a diamond tool comprising a shank having a shoulder spaced from one end thereof to define a shank portion having a predetermined axial length, a rotatable member supporting said diamond tool, means defining an axial recess in said rotatable member having a depth less than said predetermined axial length of said shank portion and having a bottom corresponding to the configuration of said one end of said shank, an annular ring received on said shank and having a surface frictionally engaging said shoulder, said ring also engaging an adjacent surface of said rotatable member when said one end engages said bottom of said recess, and adjustable fastening means urging said ring and said rotatable member into engagement to thereby vary the frictional forces between said ring surface and said shoulder, thereby presetting the torque required for relative rotation between said rotatable member and said shank.

8. A tool holder as defined in claim 7, in which said last means comprise threaded screws extending through openings in said ring and received in threaded openings in said rotatable member.

9. A tool holder as defined in claim 8, in which said ring is distorted by tightening of said screws to thereby produce a spring force on said shoulder.